United States Patent [19]

Fuchs et al.

[11] Patent Number: 5,124,138
[45] Date of Patent: Jun. 23, 1992

[54] WORK-UP OF AQUEOUS MOTHER LIQUORS CONTAINING HYDROCHLORIC ACID, SULFURIC ACID AND THEIR HYDROXYL-AMMONIUM AND AMMONIUM SALTS

[75] Inventors: Hugo Fuchs, Ludwigshafen; Gerald Neubauer, Weinheim; Josef Ritz, Ludwigshafen, all of Fed. Rep. of Germany

[73] Assignee: BASF Aktiengesellschaft, Ludwigshafen, Fed. Rep. of Germany

[21] Appl. No.: 631,155

[22] Filed: Dec. 20, 1990

[30] Foreign Application Priority Data

Dec. 21, 1989 [DE] Fed. Rep. of Germany ....... 3942334

[51] Int. Cl.⁵ .................. C01B 21/093; C07C 249/04
[52] U.S. Cl. .................................. 423/388; 423/387; 564/267
[58] Field of Search ................. 564/267; 423/387, 388

[56] References Cited

U.S. PATENT DOCUMENTS 3,701,809 10/1972 De Rooij et al. .................. 423/387
3,720,758 3/1973 De Rooij et al. .................. 564/267

FOREIGN PATENT DOCUMENTS 265240 10/1968 Austria .
2921649 12/1980 Fed. Rep. of Germany .
5188 2/1975 Japan ................................. 564/267
1491139 11/1977 United Kingdom .

*Primary Examiner*—Wayne Langel
*Attorney, Agent, or Firm*—Keil & Weinkauf

[57] ABSTRACT

A process for working up aqueous mother liquors containing hydrochloric acid, sulfuric acid and their hydroxylammonium and ammonium salts, entails the mother liquors being intimately mixed with an excess of cyclohexanone based on the content of hydroxylammonium salts, while maintaining a pH of from 3 to 5.5 by adding alkali metal hydroxide solutions, and the cyclohexanone phase which contains cyclohexanone oxime being removed and washed with water until essentially free of chloride.

4 Claims, No Drawings

WORK-UP OF AQUEOUS MOTHER LIQUORS CONTAINING HYDROCHLORIC ACID, SULFURIC ACID AND THEIR HYDROXYL-AMMONIUM AND AMMONIUM SALTS

The production of hydroxylammonium chloride expediently starts from hydroxylammonium sulfate which is produced industrially in large quantities. The expedient process is to pass gaseous hydrogen chloride into a concentrated aqueous solution of hydroxylammonium sulfate and then to cool, when crystalline hydroxylammonium chloride separates out and is removed from the mother liquor. The resulting mother liquors contain hydrochloric acid, sulfuric acid and their hydroxyalmmonium and ammonium salts, the latter driving from the production of hydroxylammonium sulfate. Disposal via biological treatment plants is contraindicated because the action of the latter would be considerably impaired. On the other hand, there would be considerable difficulties in the evaporating and further processing the resulting mother liquors because of their extreme corrosivity.

It woad thus an object of the present invention to dispose of aqueous mother liquors containing hydrochloric acid, sulfuric acid and their hydroxylammonium and ammonium slats and thereby to obtain desired products with a low chloride content.

We have found that this object is achieved in a process for working up aqueous mother liquors containing hydrochloric acid, sulfuric acid and their hydroxylammonium and ammonium slats, which entails the mother liquors being imtimately mixed with an excess of cyclohexanone based on the content of hydroxylammonium salts, while maintaining a pH of from 3 to 5.5 by adding alkali metal hydroxide solution, and the cyclohexanone phase which contains cyclohexanone oxime being removed and washed with water until essentially free of chloride.

The novel process has the advantage that essentially chloride-free cyclohexanone oxime is obtained as a solution in cyclohexanone and can be used directly for the production of caprolactam. The novel process has the additional advantage that the waste water resulting from it can be disposed of without difficulty.

The process according to the invention starts from aqueous mother liquors containing hydrochloric acid, sulfuric acid and their hydroxylammonium and ammonium salts. As a rule, the mother liquors contain for 2 to 10% by weight hydrochloric acid, 30 to 60% by weight sulfuric acid, 2 to 10% by weight hydroxylamine in the form of chloride and sulfate, and 1 to 5% by weight ammonia in the form of chloride and sulfate. A typical mother liquor contains, for example, from 3 to 5% by weight hydrochloric acid, 40 to 50% by weight sulfuric acid, 3 to 6% by weight hydroxylamine as chloride and sulfate, and 1.5 to 3% by weight ammonia in the form of chloride and sulfate Such mother liquors are obtained, for example, in the production of the hydroxylammonium chloride when gaseous hydrogen chloride is passed into a saturated solution of hydroxylammonium sulfate, which contains small amounts of ammonium sulfate from its production, during which the temperature of the mixture rises, and then the solution is cooled and crystalline hydroxylammonium chloride which has separated out is removed from the mother liquor.

The mother liquor is mixed with an excess of cyclohexanone based on the content of hydroxylammonium salts, and a pH of from 3 to 5.5 is maintained by adding alkali metal hydroxide. This results in conversion of the hydroxylammonium salts into cyclohexanone oxime giving a solution thereof in cyclohexanone.

Examples of suitable alkali metal hydroxides are sodium hydroxide and potassium hydroxide. Low-cost sodium hydroxide is preferably used in industry. The alkali metal hydroxides are expediently used as aqueous solutions, eg. containing from 10 to 50% by weight of alkali metal hydroxide. Care is taken, by continuous addition of alkali metal hydroxide solution during the reaction, that the said pH of from 3 to 5.5, in particular from 4 to 5, is maintained. The aqueous mother liquor and cyclohexanone are advantageously passed in opposite directions, eg. through a rotating disk column, with cyclohexanone entering at the bottom and the mother liquor at the top, and an aqueous solution essentially composed of ammonium sulfate and chloride, sodium sulfate and chloride, small amounts of hydroxylammonium sulfate and chloride, and small amounts of dissolved cyclohexanone, being removed at the bottom. A cyclohexanone solution of cyclohexanone oxime, which is still contaminated with chlorides an sulfates, is obtained at the top of the column. The reaction can also be carried out batchwise in other equipment, eg. a stirred tank, or in continuous mixer-settler equipment.

It is advantageous to use not less than 2 moles of cyclohexanone, in particular 2to 5 moles, per mole of hydroxylammonium salts contained in the mother liquor. The reaction is normally carried out at from 10° to 90° C., expediently at from 15° to 60° C.

The resulting cyclohexanone solution of cyclohexanone oxime is washed essentially free of chloride with water. This is expediently carried out by intimately mixing in a countercurrent column and separating into a purified cyclohexanone solution of cyclohexanone oxime and a dilute aqueous solution which contains sulfates and chlorides and small amounts of cyclohexanone as impurities. It is expedient to use from 0.1 to 5 parts by volume of water from each part by volume of cyclohexanone solution of cyclohexanone oxime.

It is advantageous to combine the abovementioned aqueous washings with the aqueous solution obtained after reaction with cyclohexanone and removal of the cyclohexanone phase containing the cyclohexanone oxime, and to recover, by steam stripping, and recycle the cyclohexane phase containing the cyclohexanone oxime, and to recover, by steam stripping, and recycle the cyclohexanone phase containing the cyclohexanone oxime, and to received by steam stripping, and recycle the cyclohexanone dissolved therein. The remaining aqueous solution still contains 20 mg.kg TOC and 0.05% by weight hydroxylamine. This solution can be disposed of as waste water requiring treatment.

The resulting cyclohexanone solution of cyclohexanone oxime contains less than 2 mg/kg chloride, eg. from 0.5 to 1 mg/kg, and can be used without difficulty for the production of caprolactam.

The process according to the invention is to be illustrated by means of the example which follows.

EXAMPLE 500 g of a mother liquor containing 0.66 mol of hydroxylamine, from the production of hydroxylammonium chloride, with the following composition:
43.6 g/kg hydroxylamine (as salt)

42.2 g/kg hydrochloric acid
46.4 g/kg sulfuric acid
2.05 g/kg ammonia (as salt)
were reacted with 194 g of cyclohexanone (1.98 mol) with the addtion of sodium hydroxide solution at 35° C. The pH was adjusted to 4.9. The amount of 40% strength sodium hydroxide solution required for this was 530 g. After the reaction was complete, the organic phase was separated from the aqueous phase.

The organic phase contains about 10 mg/kg chloride ions. The chloride content can be reduced to <1 mg/kg by washing with 3 times the amount of water. This ketone/oxime mixture can be processed without problems in a conventional plant for the production of cyclohexanone oxime.

The aqueous phase from the oximation is mixed with the aqueous washings and steam-stripped. The solution then contains 20 mg/kg TOC and 0.05% hydroxylamine and can be disposed of as waste water requiring treatment.

We claim:

1. A process for working up aqueous mother liquors containing from 2 to 10% by weight of hydrochloric acid, 30 to 60% by weight of sulfuric acid, 2 to 10% by weight of hydroxylamine in the form of chloride and sulfate and 1 to 5% by weight of ammonia in the form of chloride and sulfate, which comprises intimately mixing the mother liquors with from 2 to 5 moles of cyclohexanone based on the content of hydroxylammonium salts, while maintaining a pH of from 3 to 5.5 by adding an alkali metal hydroxide solution, removing the cyclohexanone phase which contains cyclohexanone oxime and washing said phase with water until the cyclohexanone phase is essentially free of chloride, and removing chclohexanone from the remaining combined aqueous solutions by steam stripping and recycling.

2. A process as defined in claim 1, wherein a pH of from 4 to 5 is maintained.

3. A process as defined in claim 1, wherein the mother liquor and cyclohexanone are reacted at from 15° to 60° C.

4. A process as defined in claim 1, wherein the solution of cyclohexanone oxime in cyclohexanone is washed with water until the chloride content is <2 mg/kg.

* * * * *